(12) United States Patent (10) Patent No.: US 8,140,793 B2
Nonaka et al. (45) Date of Patent: Mar. 20, 2012

(54) VIRTUAL TAPE DEVICE, DATA BACKUP METHOD, AND RECORDING MEDIUM

(75) Inventors: Hajime Nonaka, Tokyo (JP); Yoshiaki Mori, Tokyo (JP); Makoto Nakajima, Tokyo (JP); Muneyuki Yoshikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 447 days.

(21) Appl. No.: 12/490,604

(22) Filed: Jun. 24, 2009

(65) Prior Publication Data

US 2009/0327599 A1 Dec. 31, 2009

(30) Foreign Application Priority Data

Jun. 26, 2008 (JP) ................................. 2008-167273
Jun. 18, 2009 (JP) ................................. 2009-144912

(51) Int. Cl.
*G06F 13/00* (2006.01)
(52) U.S. Cl. ....................................................... 711/162
(58) Field of Classification Search ........................ None
See application file for complete search history.

(56) References Cited

FOREIGN PATENT DOCUMENTS

| JP | 5-67372 A | 3/1993 |
|---|---|---|
| JP | 6-259930 A | 9/1994 |
| JP | 9-50351 A | 2/1997 |
| JP | 1999272426 A | 10/1999 |
| JP | 2002032198 A | 1/2002 |
| JP | 2004355188 A | 12/2004 |
| JP | 2005055945 A | 3/2005 |
| JP | 2005099971 A | 4/2005 |
| JP | 2005539303 A | 12/2005 |
| JP | 2006260392 A | 9/2006 |
| JP | 2007241334 A | 9/2007 |
| JP | 2008102578 A | 5/2008 |
| JP | 2009507281 A | 2/2009 |
| WO | 2007041377 A | 4/2007 |
| WO | 2007079056 A | 7/2007 |

OTHER PUBLICATIONS

Japanese Office Action for JP2009-144912 issued Oct. 5, 2010.
Japanese Office Action for JP2009-144912 issued Jun. 1, 2010.

*Primary Examiner* — Duc Doan

(57) ABSTRACT

To provide a virtual tape device to reduce power consumption by utilizing a disk array device conforming to MAID. Two or more disk devices are divided into an information managing disk group whose power is kept on at all times and to two or more recording disk groups whose power is turned on/off as necessary when managing data. The virtual tape device includes: a volume information managing part which manages positions of virtual tapes allotted to storage areas of the recording disk groups; and a data managing part which rearranges, in the recording disk group whose power is on, the virtual tape for storing the data to the recording disk group whose power is off based on writing/reading information stored in the information managing disk group and positional information of the virtual tapes, and executes a control to write backup data to the recording disk group whose power is on.

22 Claims, 13 Drawing Sheets ial tape device used for backup in a computer device and, more specifically, to a technique which can reduce the number of startup actions in addition to reducing the power consumption of the virtual tape device.

VIRTUAL TAPE DEVICE, DATA BACKUP METHOD, AND RECORDING MEDIUM

CROSS-REFERENCE TO RELATED APPLICATION

This application is based upon and claims the benefit of priority from Japanese patent applications No. 2008-167273, filed on Jun. 26, 2008, and No. 2009-144912, filed on Jun. 18, 2009, the disclosure of which is incorporated herein in its entirety by reference.

BACKGROUND OF THE INVENTION

1. Field of the Invention

The present invention relates to a virtual tape device used for backup in a computer device and, more specifically, to a technique which can reduce the number of startup actions in addition to reducing the power consumption of the virtual tape device.

2. Description of the Related Art

In accordance with increased data amount in computer systems, the storage capacitance thereof has become increased. This induces more and more increase in the importance in data backup. There has been developed a virtual tape device as depicted in Japanese Unexamined Patent Publication 2006-260392 (Patent Document 1), which uses, instead of a magnetic tape device, a magnetic disk device as a storage device to which the data is to be backed up. The virtual tape device is a device in which a magnetic disk is virtually used to be emulated as a magnetic tape device.

Recently, the power consumption amount has become an issue since there has been a demand to cut the operating cost (TCO). Normally, in a storage device such as a magnetic disk array device employed in the above-mentioned virtual tape device, the power consumption amount increases in proportional to the storage capacity. MAID (Massive Array of Idle Disk) technique proposed by Dirk Grunwald of University of Colorado has achieved a new-type backup system which can have advantages of both the magnetic disk device and the magnetic tape device. With this MAID technique, it is required to achieve low power consumption through stopping the magnetic disk device that is not accessed very often. The low power consumption of a magnetic disk device of a RAID structure is achieved by storage devices disclosed in Japanese Unexamined Patent Publication 2005-099971 (Patent Document 2), Japanese Unexamined Patent Publication 11-272426 (Patent Document 3), Japanese Unexamined Patent Publication 2007-241334 (Patent Document 4), and Japanese Unexamined Patent Publication 2008-102578 (Patent Document 5), for example.

Normally, when on/off operations of the power in the magnetic device are repeated, a failure rate thereof becomes increased. Therefore, in the backup system using the MAID technique, the frequency of supplying the power to the magnetic disk device is limited. More specifically, when the power is supplied to the magnetic disk device once, it is necessary to keep the on-state for a specific time without turning it off immediately.

The disk array devices depicted in Patent Document 2, Patent Document 3, Patent Document 4, and Patent Document 5 employ the MAID technique. When this MAID technique is applied to the virtual tape device, the power of the corresponding magnetic disk device is turned on every time when works for a certain virtual tape, such as recognizing the volume, allotting the virtual tape, and positioning of the tape, are to be conducted.

Specifically, with the storage device depicted in Patent Document 3 in particular, when a command for data writing processing for the magnetic disk device whose power is on is outputted, the magnetic device whose power is off is started up to recopy the data stored in the magnetic disk device (power is on) to the started-up magnetic disk device by synchronizing with the execution of the data writing processing to the magnetic disk device (power is on).

Therefore, with the storage device described above, the power supplied to the magnetic disk device can be suppressed when there is no command for the writing processing. As a result, the power consumption can be reduced.

However, the storage device manages the data supposing that the reading processing as well as the writing processing is to be executed. Thus, to start up the magnetic disk device whose power is off every time when a command for the writing processing is outputted means that it is necessary to supply the power every time the magnetic dusk device is started up. Therefore, it does not necessarily result in reducing the power consumption.

Further, the started-up magnetic disk device is turned off essentially after a specific time has passed from the time at which the device is started up. Thus, the number of turning the power of the magnetic disk device on/off is increased, so that MTBF (Mean Time Between Failure) is shortened. This may shorten the product life of the storage device itself.

SUMMARY OF THE INVENTION

It is therefore an exemplary object of the present invention to reduce the power consumption in a virtual tape device, and to provide a virtual tape device, a data backup method, and a recording medium, which can extend the product life of the virtual tape device itself.

In order to achieve the foregoing exemplary object, the virtual tape device according to an exemplary aspect of the invention is a virtual tape device combined with a higher-order device that manages data with a tape device, in order to manage the data, which is managed by the higher-order device with the tape device, with a disk base that uses two or more disk devices. The two or more disk devices are divided into an information managing disk group whose power is kept on at all times and to two or more recording disk groups whose power is turned on/off as necessary when writing/reading the data. The virtual tape device includes: a volume information managing part which manages positions of virtual tapes allotted to storage areas of the recording disk groups; and a data managing part which rearranges, in the recording disk group whose power is on among the recording disk groups, the virtual tape for storing the backup data to the recording disk group whose power is off based on writing or reading information stored in the information managing disk group and positional information of the virtual tapes managed by the volume information managing part, and executes a control to write the backup data to the recording disk group whose power is on.

In the above, the present invention is built as the virtual tape device as hardware. However, the present invention is not limited only to such case. The present invention may be built also as a data backup method or a recording medium to which a control program as software is recorded.

When the present invention is built as a data backup method, the data backup method according to another exemplary aspect of the invention is built as a data backup method using a combination of a higher-order device that manages data with a tape device and a virtual tape device that manages data with a disk base to manage the data, which is managed by the higher-order device with the tape device, with a disk base that uses two or more disk devices. The data backup method includes: dividing the two or more disk devices into an information managing disk group whose power is kept on at all times and to two or more recording disk groups whose power is turned on/off as necessary when writing/reading the data; managing positions of virtual tapes allotted to storage areas of the recording disk groups by storing the positions into the information managing disk group; rearranging, in the recording disk group whose power is on among the recording disk groups, the virtual tape for storing the backup data to the recording disk group whose power is off based on writing or reading information and positional information of the virtual tapes stored in the information managing disk group; and executing a control to write the backup data to the recording disk group whose power is on.

When the present invention is built as a recording medium, the recording medium according to still another exemplary aspect of the invention is built as a recording medium to which a data backup program is recorded for controlling management of data, which is to be managed by a higher-order device using a tape device, with a disk base that uses two or more disk devices by combining the higher-order device that manages the data with the tape device and a virtual tape device that manages the data with a disk base. The two or more disk devices are divided into an information managing disk group whose power is kept on at all times and to two or more recording disk groups whose power is turned on/off as necessary when writing/reading the data. The program enables a computer to execute: a function of managing positions of virtual tapes allotted to storage areas of the recording disk groups by storing the positions into the information managing disk group; and a function of rearranging, in the recording disk group whose power is on among the recording disk groups, the virtual tape for storing the backup data to the recording disk group whose power is off based on writing or reading information and positional information of the virtual tapes stored in the information managing disk group, and executing a control to write the backup data to the recording disk group whose power is on.

DETAILED DESCRIPTION OF THE EXEMPLARY EMBODIMENTS

Hereinafter, exemplary embodiments of the invention will be described in detail by referring to the accompanying drawings.

Figure 1:
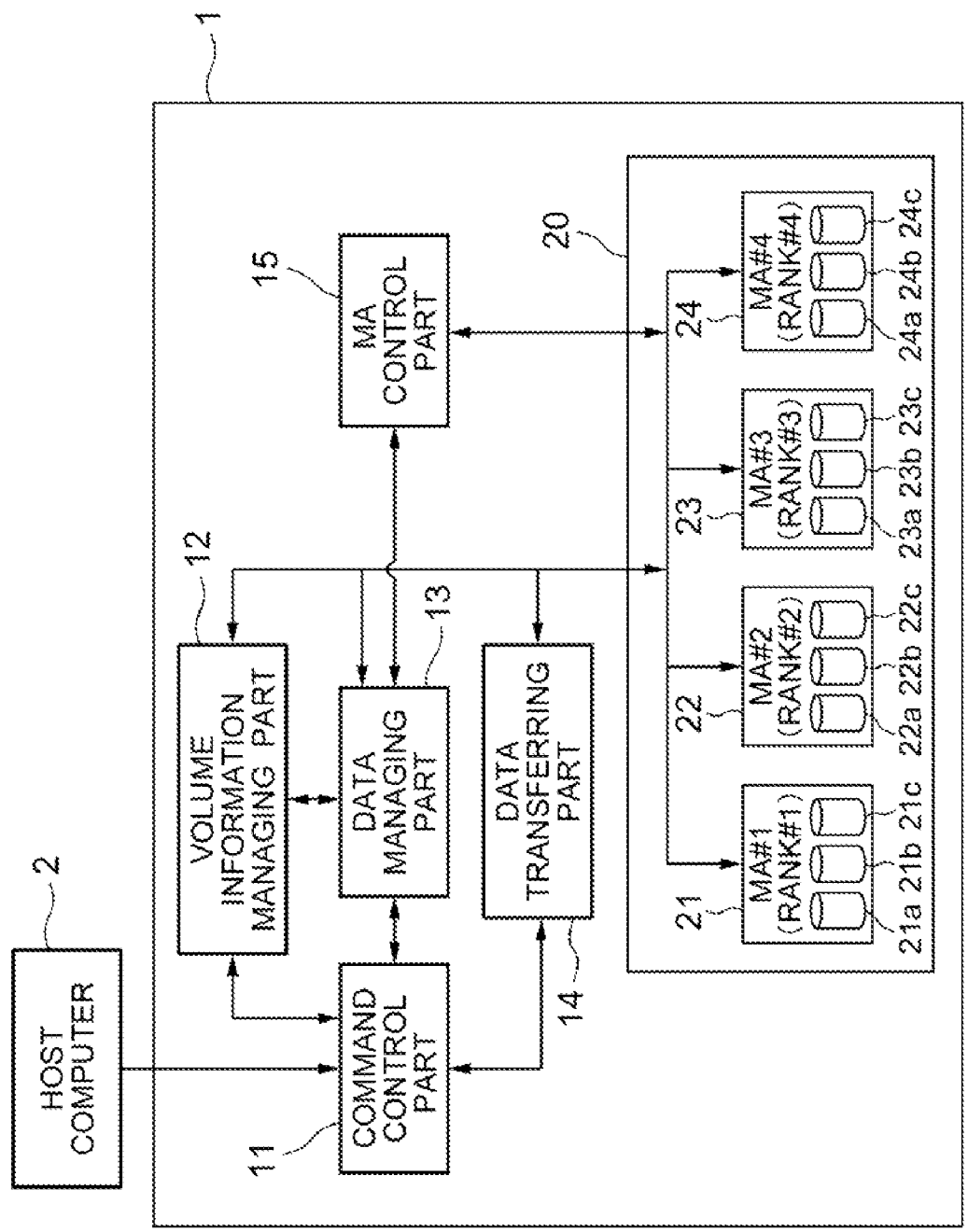
FIG. 1 is a conceptual diagram showing the structure of a virtual tape device according to a first exemplary embodiment of the invention.
Figure 4:
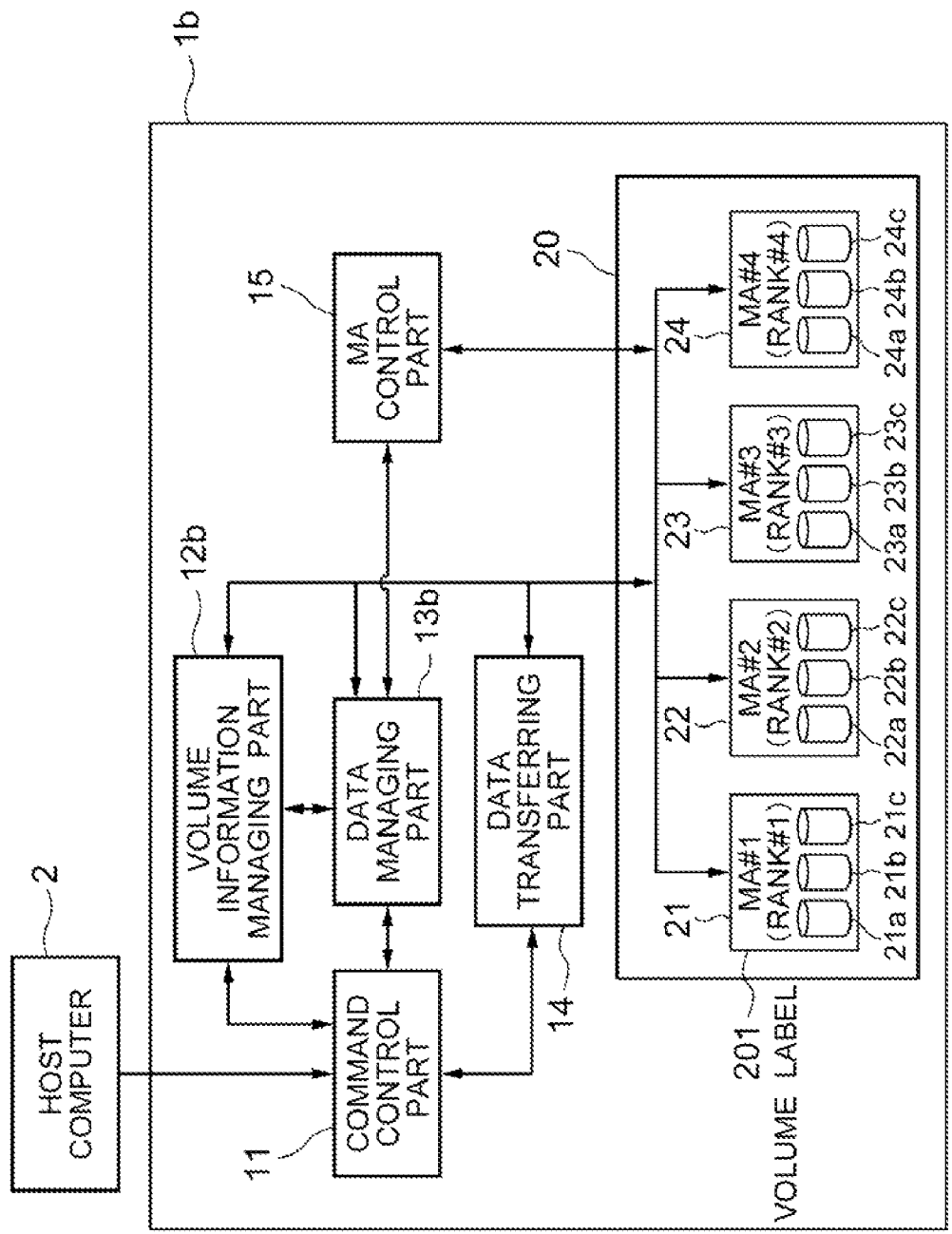
FIG. 4 is a conceptual diagram showing the structure of a virtual tape device according to a second exemplary embodiment of the invention.
Figure 8:
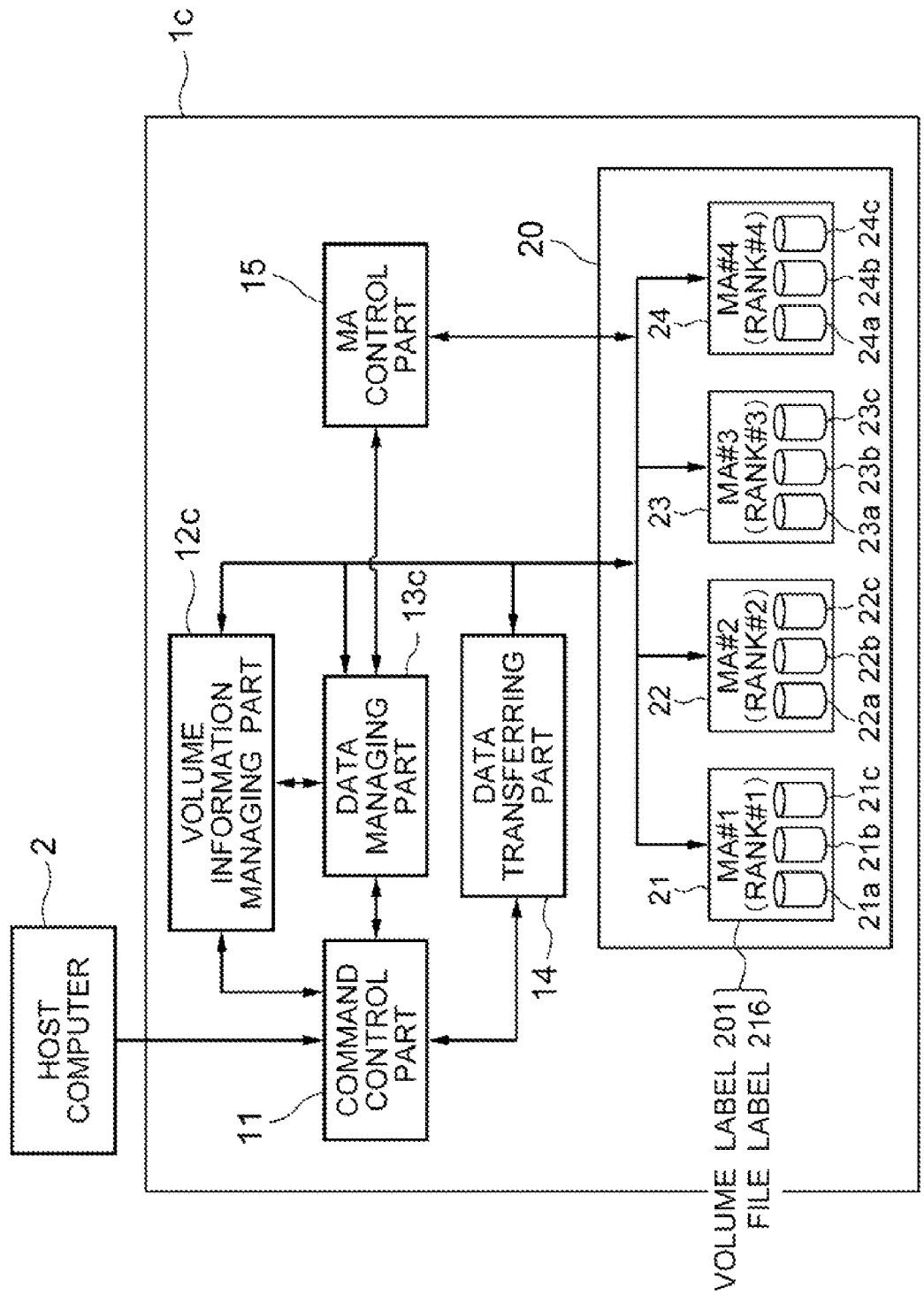
FIG. 8 is a conceptual diagram showing the structure of a virtual tape device according to a third exemplary embodiment of the invention.

As shown in FIG. 1, FIG. 4, and FIG. 8, virtual tape devices 1, 1b, and 1c according to exemplary embodiments of the invention are used in combination with a host computer 2 as a higher-order device. The host computer 2 controls writing (backup) and loading (restoring) of data with magnetic tape devices, and the virtual tape devices 1, 1b, and 1c perform data managements that are supposed to be executed by the magnetic tape device as managements on a disk base by using two or more magnetic disk devices while keeping an operation mode of data managements executed by the host computer 2 with the magnetic tape devices. The exemplary embodiments use magnetic tape devices which write/read data to/from magnetic tapes as the tape devices, and use magnetic disk devise which write/read data to/from magnetic disk as the disk devices. However, the present invention is not limited only to such case. As the tape device, a tape device other than the magnetic tape device using the magnetic tape, e.g., a tape device in a form which backs up/restores data in a strip-type recording medium, may be used as well. Further, as the disk device, it is also possible to use a disk device which backs up/restores data to a disk by using optical signals or a disk device which backs up/restores data to a semiconductor memory, instead of using the magnetic disk device which backs up/restores data to the magnetic disk. Hereinafter, for simplifying the explanations, the exemplary embodiments of the invention will be described by referring to a case where the magnetic tape device is used as the tape device and the magnetic disk device is used as the disk device.

The structures of the virtual tape devices 1, 1b, and 1c according to the exemplary embodiments of the invention will be described. The virtual tape devices 1, 1b, and 1c are recognized by the host computer 2 as the magnetic tape devices, and those are so-called emulator devices which manage the data not by the magnetic tape device but by a disk base with two or more magnetic disk devices.

The virtual tape devices 1, 1b, and 1c are recognized by the host computer 2 as the magnetic tape devices. Thus, when the host computer 2 recognizes the virtual tape devices 1, 1b, and 1c, the host computer 2 recognizes the virtual tape devices 1, 1b, and 1c as the magnetic tape devices. Thereby, the host computer 2 executes the data processing in such an operation mode that the data is managed with the magnetic tape devices. Therefore, even when data management can be achieved not by the magnetic tape device but with a disk base using two or more magnetic disk devices through the use of the virtual tape devices 1, 1b, and 1c, it is unnecessary to change the system itself of the host computer 2 to be suited for the data management using the disk base. This makes it possible for the host computer 2 to manage the data with the disk base by using the two or more magnetic disk devices, while keeping such operation mode that the data is managed by the magnetic disk devices.

Further, the virtual tape devices 1, 1b, and 1c are recognized by the host computer 2 as the magnetic tape devices. Thus, when the host computer 2 executes data management with the magnetic tape devices, the virtual tape devices 1, 1b, and 1c emulate the magnetic disk devices of a disk array group 20 as virtual tapes (corresponds to magnetic tapes of the magnetic tape devices) as sequential access media, and manage the data that is managed by the magnetic tape devices with the disk base by using the two or more magnetic disk devices based on the emulated virtual tapes, i.e., based on the volume. The virtual tape devices 1, 1b, and 1c emulate the magnetic disk devices as the volume, and it is typical to combine the volume with a robot (accessor) to be handled so as to use the disk array group 20 as a tape library.

Since the virtual tape devices 1, 1b, and 1c emulate the magnetic disk devices of the disk array group 20 as the virtual tapes as the sequential access media, the data accessed by the virtual tape devices 1, 1b, and 1c are limited to the data of the virtual tape that is being mounted among the tape library. Note here that the virtual tape that is being mounted corresponds to the magnetic tape of the magnetic tape device which is the target of data management (backup, restoring, etc) executed by the host computer 2.

As shown in FIG. 1, FIG. 4, and FIG. 8, the virtual tape devices 1, 1b, and 1c have the disk array group 20 for allowing the host computer 2 to manage the data (whish is supposed to be managed by the magnetic tapes of the magnetic tape devices) not with the magnetic tapes of the magnetic tape devices but with the disk base by using the two or more magnetic disk devices. The disk array group 20 has two or more disk arrays 21, 22, 23, and 24 in which two or more magnetic disk devices are combined.

In the cases shown in FIG. 1, FIG. 4, and FIG. 8, the disk array 21 is configured with a combination of three magnetic disk devices 21a, 21b, and 21c with a RAID (Redundant Arrays of Inexpensive Disks or Redundant Arrays of Independent Disks) structure. The disk array 22 is configured with a combination of three magnetic disk devices 22a, 22b, and 22c with a RAID structure. The disk array 23 is configured with a combination of three magnetic disk devices 23a, 23b, and 23c with a RAID structure. The disk array 24 is configured with a combination of three magnetic disk devices 24a, 24b, and 24c with a RAID structure. Further, the magnetic disk devices 21a, 21b, 21c included in the disk array 21, the magnetic disk devices 22a, 22b, 22c included in the disk array 22, the magnetic disk devices 23a, 23b, 23c included in the disk array 23, and the magnetic disk devices 24a, 24b, 24c included in the disk array 24 are turned on/off simultaneously by having the respective disk arrays 21, 22, 23, and 24 as the unit, respectively.

Further, the magnetic disk devices 21a, 21b, 21c included in the disk array 21, the magnetic disk devices 22a, 22b, 22c included in the disk array 22, the magnetic disk devices 23a, 23b, 23c included in the disk array 23, and the magnetic disk devices 24a, 24b, 24c included in the disk array 24 are set to share a parity by being divided into two or more sets. The set of the magnetic disk devices that share the parity is called "RANK", and two or more RANKs can be set in the RAID. In the case of FIG. 1, RANKs #1-#4 are set in the disk array group 20. There are four disk arrays 21, 22, 23, 24 included in the disk array group 20, and the RANKs #1-#4 are set in the disk array group 20 in the case of FIG. 1. However, the present invention is not limited only to such case, and various modifications can be applied as necessary.

As described above, the two or more disk arrays 21, 22, 23, and 24 included in the disk array group 20 are recognized by the virtual tape devices 1, 1b, and 1c as a visible structure from the virtual tape devices 1, 1b, and 1c, i.e., the RAID structure in which the two or more magnetic disk devices are combined physically. While the magnetic disk devices are combined with the RAID structure in the exemplary embodiment, it is also possible to combine the magnetic disk devices with a structure other than the RAID structure.

Further, a storage area as the virtual tape (volume) corresponding to the magnetic tape of the magnetic tape device is allotted to each of the magnetic disk devices 21a, 21b, 21c included in the disk array 21, the magnetic disk devices 22a, 22b, 22c included in the disk array 22, the magnetic disk devices 23a, 23b, 23c included in the disk array 23, and the magnetic disk devices 24a, 24b, 24c included in the disk array 24.

Specifically, the storage areas of the magnetic tapes of the magnetic tape devices are allotted to the storage areas of each magnetic disk device included in the respective disk arrays 21, 22, 23, and 24 as one-hundred magnetic tapes, for example. The storage area corresponding to the magnetic tapes is recognized as virtual tapes. In the case of this example, the virtual tape devices 1, 1b, and 1c emulate the magnetic disk devices of the disk array group 20 to which the one-hundred magnetic tapes are allotted as one-hundred virtual tapes (volumes). Therefore, with the virtual tape devices 1, 1b, and 1c according to the exemplary embodiments of the invention, data management (backup, restoring, etc) of the data is executed by a unit of the virtual tape (storage area allotted to each magnetic disk device of the disk array group 20). The number of the virtual tapes (storage areas allotted to each magnetic disk device of the disk array group 20) allotted as the storage area of each of the magnetic disk devices included in the respective disk arrays 21, 22, 23, and 24 are changed variously depending on the storage capacitance of each magnetic disk device included in the disk array devices 21, 22, 23, and 24 and the storage capacitance of each magnetic tape of the respective magnetic tape devices.

The virtual tape devices 1, 1b, and 1c emulate the magnetic disk devices of the disk array group 20 to which the magnetic tapes of the magnetic tape devices are allotted as two or more virtual tapes, and the host computer 2 manages the data that is supposed to be managed with the magnetic tapes of the magnetic tape devices with the disk base by using the two or more magnetic disk devices without using the magnetic tapes of the magnetic tape devices based on the emulated information (volumes, virtual tapes). Thus, the magnetic disk devices of the disk array group 20 are recognized by the host computer 2 as an invisible structure from the host computer 2 side, i.e., a virtually logic structure as the two or more magnetic tape devices.

When outputting backup data to an inactive magnetic disk device (the magnetic disk device whose power is off) among the magnetic disk devices of the disk array group 20, the virtual tapes 1, 1b, and 1c according to the exemplary embodiments of the invention rearrange the storage area (virtual tape) in the already-activated magnetic disk device (the power is on) for storing the data that is to be backed up in the magnetic disk device (the power is off) so as to write the backup data to the magnetic disk device (the power is on). Through this, the number of startup operations of the inactive magnetic disk devices can be reduced.

When managing the data (e.g., when restoring the backed up data) with the magnetic disk devices of the disk array group 20 of the virtual magnetic tape devices 1, 1b, and 1c according to the exemplary embodiments of the invention, if the power of the magnetic disk device to which the data is backed up is on, the data is restored from the magnetic disk device whose power is on. If the power of the magnetic disk device to which the data is backed up is off, the power of that magnetic disk is turned on to restore the data from the magnetic disk device whose power is turned on. The management of data is not limited to backup/restoring of data but may include cases of writing data, reading the written data, and the like. Hereinafter, for simplifying the explanations, described is the case of conducting backup/restoring of data as the data management.

As described above, the processing of the virtual tape device when restoring the data backed up in the magnetic disk device of the disk array group 20 is the same as the restoring processing of data executed in a widely-used virtual tape device.

Next, the virtual tape devices according to the exemplary embodiments of the invention will be described in more details by referring to specific examples.

First Exemplary Embodiment

As shown in FIG. 1, the virtual tape device 1 according to the first exemplary embodiment of the invention has a volume information managing part 12 and a data managing part 13 in order to manage the data, which is supposed to be executed by the host computer 2 with the magnetic tape device, with the magnetic disk device virtually i.e., manage the data from the host computer 2 not with the magnetic tape device but with the disk database by using two or more magnetic disk devices while keeping such an operation mode that data management is executed by the host computer 2 with the magnetic tape devices.

Further, the magnetic disk devices 21a, 21b, 21c-24a, 24b, 24c included in the disk array group 20 are divided into an information management magnetic disk group whose power is kept to an on-state at all times and to two or more recording disk groups where the data is managed. In the case of FIG. 1, the information managing disk group contains the magnetic disk devices 21a, 21b, and 21c which are included in the disk array 21. Further, the two or more recording disk groups contain the magnetic disk devices 22a, 22b, 22c which are included in the disk array 22, the magnetic disk devices 23a, 23b, 23c which are included in the disk array 23, and the magnetic disk devices 24a, 24b, 24c which are included in the disk array 24.

Further, as shown in FIG. 1, the virtual tape device 1 according to the exemplary embodiment of the invention has a command control part 11, a data transferring part 14, and an MA control part 15.

The command control part 11 receives a command (instruction) from the host computer 2 that is a higher-order device, analyzes the received command, and controls data communication with the host computer 2 and data communication inside the virtual tape device 1 based on the analyzed result.

The volume information managing part 12 manages the management information (volume information) of the virtual tapes in the disk array group 20 by storing it to the magnetic disk devices 21a, 21b, and 21c of the disk array whose power is kept on at all times based on the result analyzed by the command control part 11. According to moving instructions such as mount or demount of the virtual tapes from the host computer 2 analyzed by the command control part 11, the volume information managing part 12 manages shifting of the virtual tapes such as the placed positions of the virtual tapes in the disk array group 20 or positional information of the virtual tapes rearranged by the data managing part 13 that is described later, i.e., the positional information of the virtual tapes (volume information) which are placed on the magnetic disk device in the disk array group 20 to which the data (supposed to be backed up/restored to the magnetic tapes of the magnetic tape devices) is to be recorded.

The virtual tapes in the disk array group 20 correspond to the storage areas allotted for backing up/restoring data by being corresponded to the magnetic tapes of the magnetic tape devices in the storage areas of the magnetic disk devices of the disk arrays 22, 23, and 24. Therefore, the position of the virtual tape in the disk array group 20 means the position where the storage area allotted for backing up/restoring the data is arranged in the storage areas of the magnetic disk devices of the disk arrays 22, 23, and 24.

With the system which performs backup/restoring of data by using the widely-used virtual tae devices, it is necessary to activate the head block of the virtual tape, i.e., it is necessary to perform processing for turning on the magnetic disk device where the data of the virtual tape is stored, for executing backup/restoring of the data by having the stored position of the data stored to the magnetic disk device as the reference.

However, in the first exemplary embodiment of the invention, when the data management part 13 outputs backup data to an inactive disk device (i.e., the magnetic disk device whose power is off), a storage area (virtual tape) for storing the data that is to be backed up to the magnetic disk device whose power is off is rearranged to the magnetic disk device whose power is already turned on so as to write the backup data to the magnetic disk device whose power is on.

Therefore, the data management part 13 in the first exemplary embodiment of the invention accesses to the magnetic disk devices 21a, 21b, and 21c of the disk array 21 whose power is on at all times to obtain the information of the volumes (virtual tapes) stored in those magnetic disk devices. Based on the volume information, the data management part 13 relates the addresses on the storage areas of the magnetic disk devices contained in the disk arrays 21, 22, 23, and 24 to the virtual tapes, to shift the virtual tapes to be in a mounted state.

Figure 2:
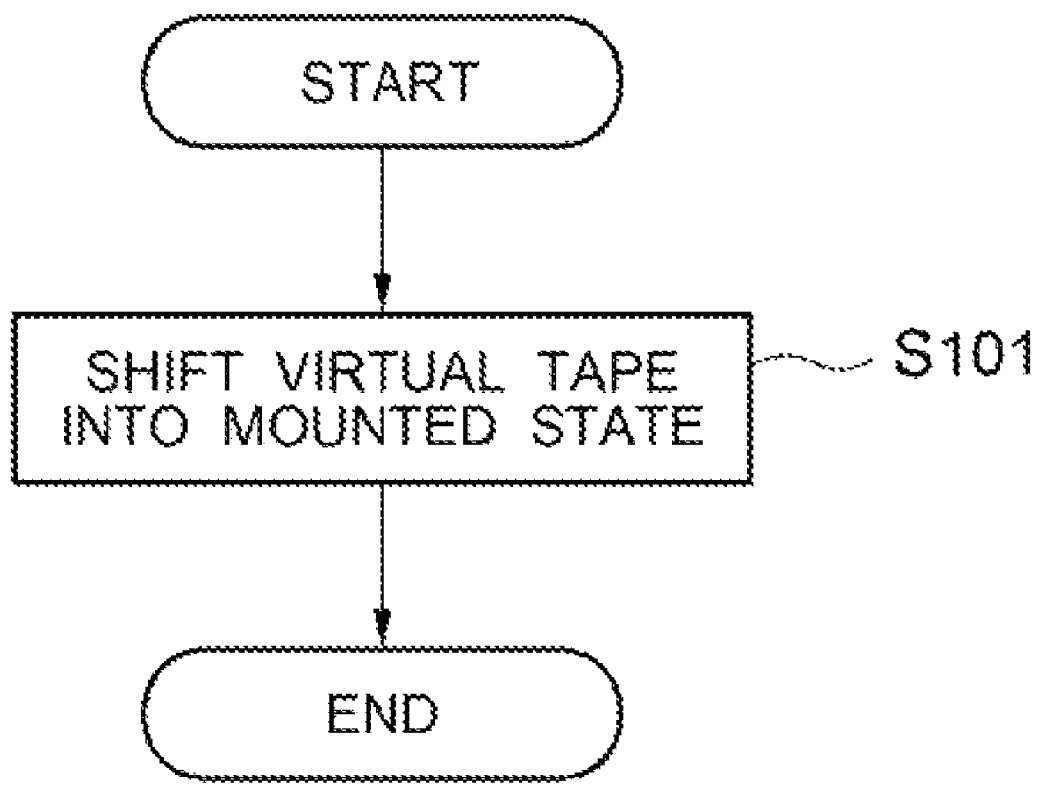
FIG. 2 is a flowchart showing mount processing of a virtual tape executed by the virtual tape device shown in FIG. 1.
Figure 12:
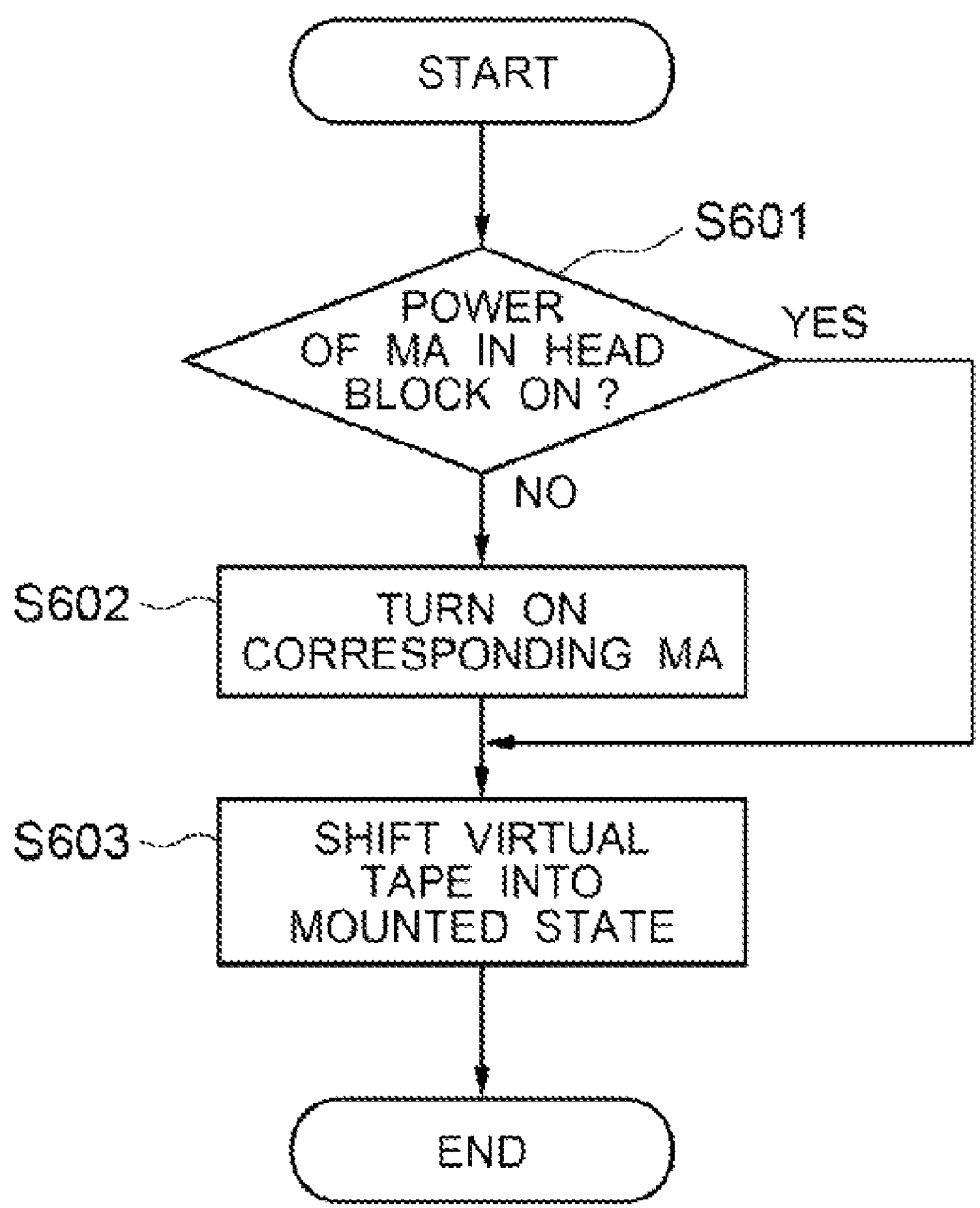
FIG. 12 is a flowchart showing mount processing of the virtual tape executed by a widely-used virtual tape device.

Thus, as shown in FIG. 2, the volume information management part 12 according to the first exemplary embodiment of the invention is characterized not to execute the activating processing of the head block of the virtual tape, which is executed in steps S601 and S602 of FIG. 12.

The data management part 13 stores at least either the information for writing the backup data to the recording disk groups of the disk arrays 22, 23, 24 or the information for reading out (restoring) the data written to the recording disk to the information managing disk group of the disk array 21 whose power is on at all times. Based on the information stored in the information managing disk group, the positional information of the virtual tapes managed by the volume information management part 12, and the information showing the on/off state of the power of the magnetic disk devices of the disk array group 20 managed by the MA control part 15 to be described later, the data managing part 13 rearranges the storage area (virtual tape) for storing the backup data to the recording disk group (power is off) to the recording disk group (power is on) among the recording disk groups, and executes a control for writing the backup data to the recording disk group (power is on) by using the rearranged virtual tape.

Further, the data managing part 13 sorts out the information (referred to as data management information hereinafter) regarding the recorded positions of the volume data of the virtual tapes based on the result analyzed by the command control part 11. Furthermore, in response to a reading command from the host computer 2 outputted from the command control part 11, the data managing part 13 returns the data-recorded positional information corresponding to the reading command to the command control part 11. In the meantime, in response to a writing command from the host computer 2, the data managing part 13 returns it to the command control part 11 by allotting the position for writing the data which corresponds to the writing command.

The volume information and the data management information is the information for relating the addresses on the magnetic disk devices and the virtual tapes. The volume information is information depicted in paragraph "0026" of Specification of Patent Document 2 and shown in FIG. 2 thereof, for example. The data management information is information depicted in paragraph "0039" of Specification of Patent Document 3 and shown in FIG. 5 thereof, for example. Those are already known to those skilled in the art, so that detailed explanations thereof are omitted herein.

Further, if the power of the magnetic disk devices (MA#2-MA #4) of the disk arrays 22, 23, and 24 for recording the data of the rearranged virtual tapes returned to the command control part 11 in response to the writing command is not on, the data managing mart 13 outputs an instruction to the MA control part 15 for inputting the power to the magnetic disk devices (MA #2-MA #4).

The data transferring part 14 transfers the backup and restoring data between the disk array group 20 and the host computer 2.

The MA control part 15 obtains the power condition of the magnetic disk devices of the disk array group 20, and executes controls to turn on/off the power of the magnetic disk devices of the disk array group 20 under controls of the data managing part 13.

In the case shown in FIG. 1, the MA control part 15 keeps the power of the magnetic disk devices 21a, 21b, 21c of the disk array 21 to be on at all times and turns on/off the power of the magnetic disk devices 22a, 22b, 22c-24a, 24b, 24c of the remaining disk arrays 22, 23, 24 under the controls of the data managing part 13. The data managing part 13 has the volume information stored in the magnetic disk devices 21a, 21b, and 21c of the disk array 21 whose power is on at all times. Further, the data transferring part 14 transfers the backup data to the magnetic disk devices of the disk arrays 22-24 or transfers the data backed up in the magnetic disk devices of the disk arrays 22-24 to the host computer 2 side.

Next, described is a case of performing a method which backs up the data to the virtual tape by using the virtual tape device according to the first exemplary embodiment of the invention.

First, described is the mount processing that is executed first in a process of the processing which outputs the backup data in the virtual tapes arranged in the magnetic disk devices of the disk arrays 22, 23, and 24 included in the disk array group 20.

In order to clarify the mount processing of the exemplary embodiment of the invention, it will be described by making a comparison with the mount processing executed in general.

As shown in FIG. 12, the mount processing executed in general detects whether or not the power of the magnetic disk device to which the volume information is recorded is on (step S601 of FIG. 12). If the power is not on, the power of the magnetic disk device is turned on (step S602 of FIG. 12). That is, the power of the magnetic disk device that stores the information of the head block of the virtual tape is set to on-state, i.e., processing for activating the head block of the virtual tape is executed. Then, the magnetic disk device corresponding to the virtual tape is set to a storable state, i.e., the virtual tape is shifted to a mounted state (step S603 of FIG. 12).

The mount processing executed in general shown in FIG. 12 is completed through a series of above-described processing process.

In the meantime, as shown in FIG. 2, the volume information managing part 12 according to the first exemplary embodiment of the invention accesses to the magnetic disk devices 21a, 21b, and 21c included in the disk array 21 whose power is on at all times to obtain the volume information stored in those disk devices, and outputs the volume information to the data managing part 13.

When receiving the volume information from the volume information managing part 12, the data managing part 13 accesses to the magnetic disk devices 21a, 21b, 21c included in the disk array 21 whose power is on at all times, obtains the data management information stored in the disk device, and shifts the virtual tapes to the mounted state by relating the virtual tapes with the addresses on the storage areas of the magnetic disk devices included in the disk arrays 21, 22, 23, 24 based on the obtained data management information and the volume information received from the volume information managing part 12. Note here that the virtual tapes correspond to the storage areas allotted by being corresponded to the magnetic tapes of the magnetic tape devices among the storage areas of the magnetic disk devices of the disk arrays 21, 22, 23, 24 for storing the data that is supposed to be stored in the magnetic tape of the magnetic tape device to the magnetic disk devices of the disk arrays 21, 22, 23, 24.

Since the data managing part 13 manages the processing from that executed after shifting the virtual tape to the mounted state to that executed for backing up the data, the volume information managing part 12 according to the first exemplary embodiment of the invention does not execute the activating processing of the head block of the virtual tape that is executed in steps S601 and S602 of FIG. 12, as is clear from FIG. 2.

Next, writing processing for backing up data to the virtual tape will be described by referring to FIG. 3. In order to clarify the writing processing of the first exemplary embodiment of the invention, it will be described by making a comparison with the writing processing executed in general.

Figure 13:
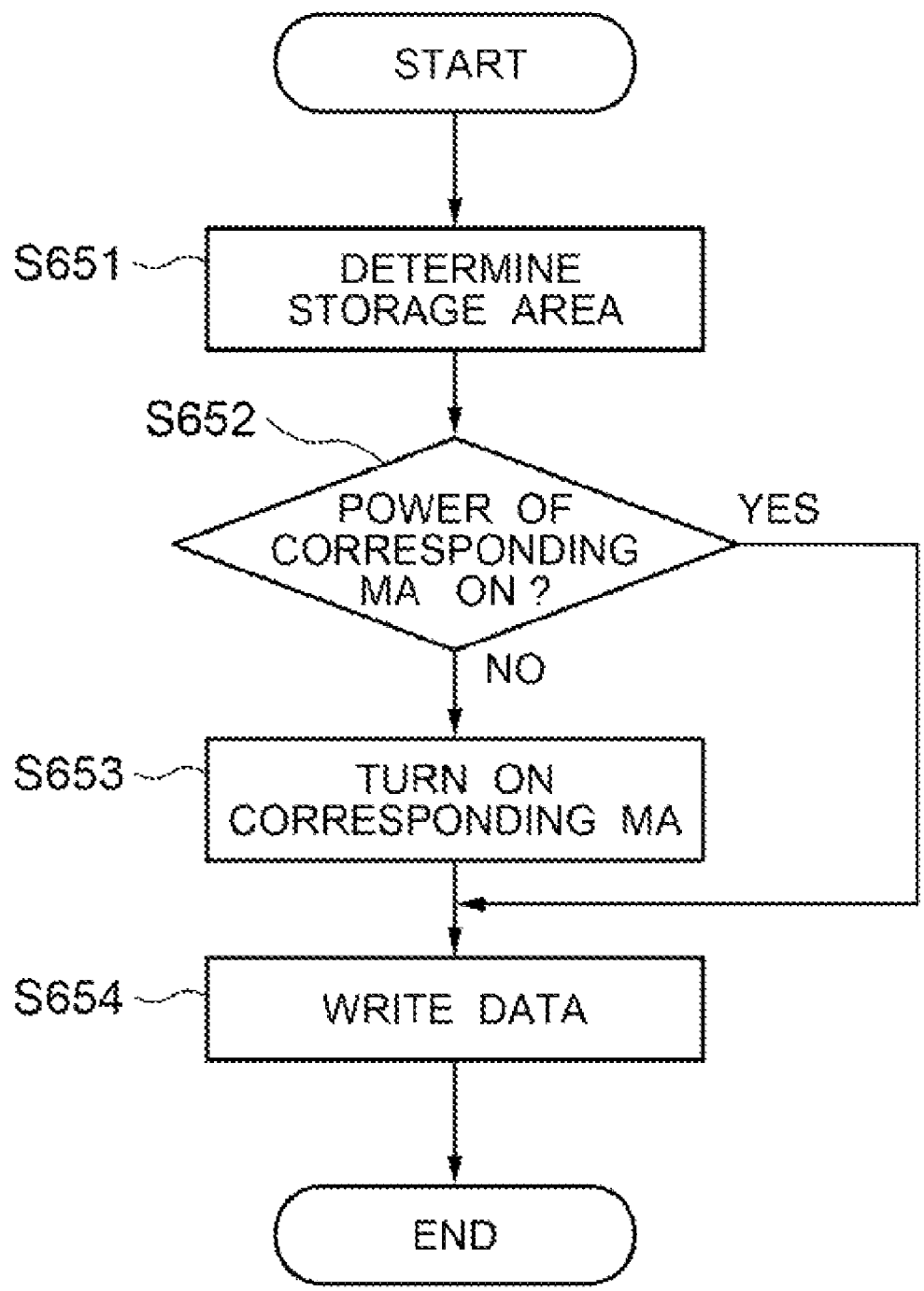
FIG. 13 is a flowchart showing writing processing of virtual tape data executed by the widely-used virtual tape device.

As shown in FIG. 13, the typical writing processing first determines the storage area of writing data (step S651 of FIG. 13). If the power of the magnetic disk device that has the determined area is not on (No in step S652 of FIG. 13), the power of the magnetic disk device is turned on (step S653 of FIG. 13). Then, the writing data is written to the storage area of the magnetic disk device whose power is turned on (step S654 of FIG. 13), and the processing executed by the writing command is completed. In this case, with the typical writing processing, the magnetic disk device is normally in off-state. Thus, it is essential to perform the processing to turn on the power of the magnetic disk device in step S652 of FIG. 13.

The reason is that, as described above, data is backed up by having the storage position of the data stored in the magnetic disk device as the reference with the widely-used data backup system.

Meanwhile, when outputting the backup data to the inactive magnetic disk device, that is, the magnetic disk device whose power is off, the first exemplary embodiment of the invention as described above is structured to rearrange the storage area (virtual tape) for storing the data to be backed up to the magnetic disk device whose power is off in the magnetic disk device whose power has been already turned on so as to write the backup data to the magnetic disk device whose power is on.

Figure 3:
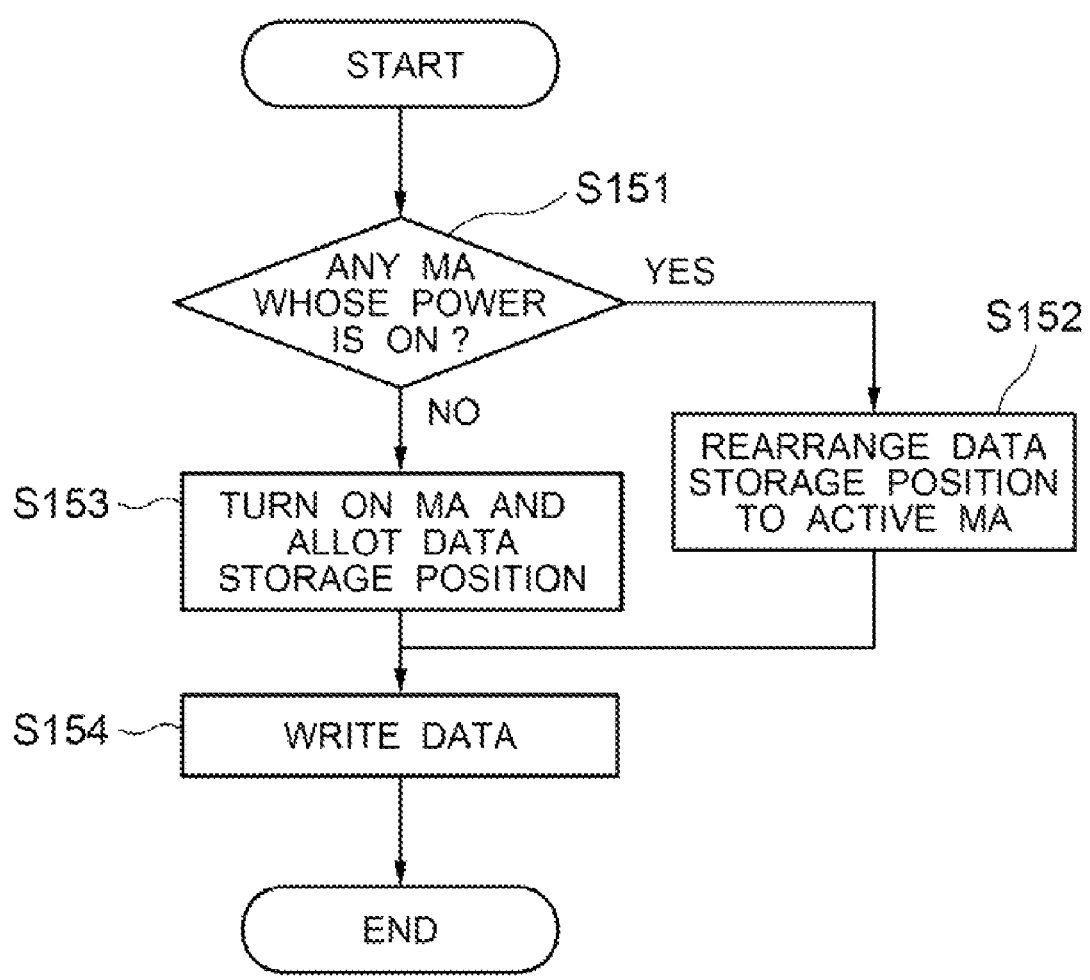
FIG. 3 is a flowchart showing writing processing of virtual tape data executed by the virtual tape device shown in FIG. 1.

That is, as shown in FIG. 3, upon obtaining the volume information from the volume information managing part 12, the data managing part 13 according to the exemplary embodiment of the invention obtains the power condition regarding whether or not the power of the magnetic disk devices 22a, 22b, 22c-24a, 24b, 24c included in the disk arrays 22, 23, 24 is on from the MA control part 15 based on the volume information and the data management information obtained by accessing to the disk array 21. When it is found by referring to the power condition that the power of one of the magnetic disk devices 22a, 22b, 22c, 23a, 23b, 23c, 24a, 24b, and 24c included in the disk arrays 22, 23, and 24 is on (Yes in step S151 of FIG. 3), the data managing part 13 rearranges the storage area (virtual tape) for storing the data to be backed up to the storage area of the magnetic disk device 22a, 22b, 22c, 23a, 23b, 23c, 24a, 24b, or 24c whose power is off to the magnetic disk device (power is on) 22a, 22b, 22c, 23a, 23b, 23c, 24a, 24b, or 24c of the disk array 22, 23, or 24 to allot the storage area (virtual tape) for storing the backup data (step S152 of FIG. 3).

Next, in step S152 of FIG. 3, after rearranging the storage area (virtual tape) to the storage area of the magnetic disk device 22a, 22b, 22c, 23a, 23b, 23c, 24a, 24b, or 24c of the disk arrays 22, 23, 24 whose power is on, the data managing part 13 notifies the volume information managing part 12 and the command control part 11 of the information thereof.

Upon receiving the notification from the data managing part 13, the command control part 11 transfers the writing data (backup data) transmitted from the host computer 2 to the data transferring part 14. This writing data is the data that is to be backed up in the magnetic disk device 22a, 22b, 22c, 23a, 23b, 23c, 24a, 24b, or 24c whose power is off.

Further, upon receiving the notification from the data managing part 13, the volume information managing part 12 updates the volume information managed thereby, and manages the updated volume information by storing it to the magnetic disk device of the disk array 21 whose power is on at all times.

The data transferring part 14 writes the writing data transferred from the command control part 11 to the magnetic disk device of the disk array 22, 23, or 24 whose power is turned on (step S154 of FIG. 3). The magnetic disk device to which the writing data is written is the magnetic disk device 22a, 22b, 22c, 23a, 23b, 23c, 24a, 24b, or 24c of the disk array device 22, 23, or 24 whose power is turned on. Further, it is the magnetic disk device whose power is turned on to which the storage area for storing the backup data is allotted by the data managing part 13 through rearranging the storage area (virtual tape) for storing the data to be backed up to the storage area of the magnetic disk device 22a, 22b, 22c, 23a, 23b, 23c, 24a, 24b, or 24c of the disk array device 22, 23, or 24 whose power is off.

When judged in step S151 of FIG. 3 that the power of all the magnetic disk devices 22a, 22b, 22c, 23a, 23b, 23c, 24a, 24b, and 24c of the disk arrays 22, 23, and 24 is off based on the information regarding the power condition transmitted from the MA control part 15 (No in step S151 of FIG. 3), the data managing part 13 outputs an instruction to the MA control part 15 to turn on the power of one of the magnetic disk devices 22a, 22b, 22c, 23a, 23b, 23c, 24a, 24b, and 24c of the disk arrays 22, 23, and 24.

The MA control part 15 turns on the power of the indicated magnetic disk device 22a, 22b, 22c, 23a, 23b, 23c, 24a, 24b, or 24c of the disk array 22, 23, or 24 according to the instruction from the data managing part 13, and notifies the data managing part 13 that the power is turned on (step S153 of FIG. 3).

Then, upon receiving the notification from the MA control part 15, the data managing part 13 rearranges the storage area (virtual tape) for storing the data to be backed up to the storage area of the magnetic disk device 22a, 22b, 22c, 23a, 23b, 23c, 24a, 24b, or 24c of the disk array 22, 23, or 24 whose power is on, and then notifies the command control part 11 that the virtual tape is rearranged (step S153 of FIG. 3).

Upon receiving the notification from the data managing part 13, the command control part 11 transfers the writing data transmitted from the host computer 2 to the data transferring part 14.

The data transferring part 14 writes the writing data transferred from the command control part 11 to the magnetic disk device of the disk array 22, 23, or 24 whose power is turned on (step S154 of FIG. 3). This writing data is the data that is to be backed up in the magnetic disk device 22a, 22b, 22c, 23a, 23b, 23c, 24a, 24b, or 24c whose power is off.

The writing processing is completed after going through a series of processing described above.

As described above, when outputting the backup data to the virtual tape that is arranged in the inactive disk device (power is off), the first exemplary embodiment of the invention is structured to rearrange the storage area (virtual tape) in the already-activated magnetic disk device (the power is on) so as to write the backup data to the magnetic disk device.

Therefore, it is possible with the first exemplary embodiment of the invention to allot the virtual tape preferentially to the disk device whose power is already being turned on if there is such disk device, so that the number of processing executed to turn on the power of the disk device whose power is off can be reduced. This makes it possible not only to reduce the power consumption of the data backup system but also to reduce the number of startup operations of the disk device. Furthermore, since it is possible to reduce the number of startup operations of the disk device, MTBF (Mean Time Between Failure) of the disk device can be extended. As a result, the product life of the storage device itself can be extended.

The present invention is designed in such a manner that the virtual tape is preferentially allotted to the disk group to which the power has already been supplied, so that, as an exemplary advantage according to the invention, it is possible to reduce the disk groups to which the power needs to be supplied anew. This makes it possible to reduce the power consumption and to reduce the number of startup operations of the disk devices.

Second Exemplary Embodiment

Next, a case of managing data by separating volume labels from the data (backup data, for example) to be managed in the first exemplary embodiment will be described as a second exemplary embodiment of the invention.

FIG. 4 is a conceptual diagram showing the structure of the virtual tape device 1b according to the second exemplary embodiment of the invention. Compared with the virtual tape device 1 according to the first exemplary embodiment of the invention shown in FIG. 1, the virtual tape device 1b of the second exemplary embodiment has different functions regarding a volume information managing part 12b and a data managing part 13b as those of the virtual tape device 1. Further, the recording positions of a part of data are different (will be described in detail later). Except for those, the structural elements and the functions are the same as those of the first exemplary embodiment. Thus, only the different points from those of the first exemplary embodiment will be described hereinafter. The other structures are the same as those of the first exemplary embodiment.

Figure 5:
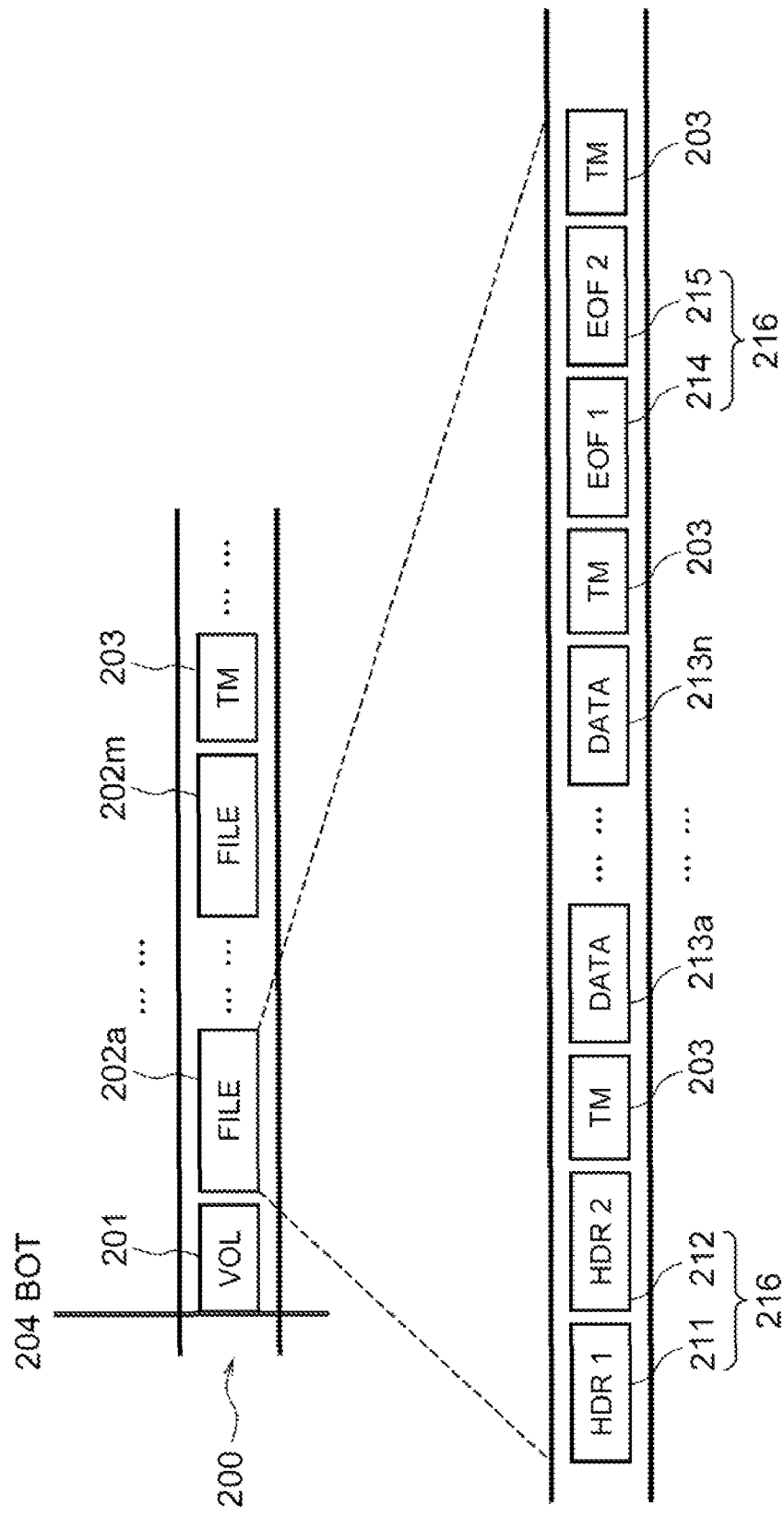
FIG. 5 is a conceptual diagram showing a format of a magnetic tape according to JIS X0601.

FIG. 5 is a conceptual diagram showing a format of a magnetic tape according to JIS X0601, "label and file structure of information exchanging magnetic tape". The format shown in FIG. 5 is a typical format of a backup magnetic tape. The virtual tape is also a tape which is emulated as a magnetic tape of a magnetic tape device, so that it is common for the virtual tape to be in conformity to the format of the magnetic tape shown in FIG. 5.

In a magnetic tape 200, data is recorded in order from a volume label 201 (VOL), a plurality of files 202a-202m, to a tape mark 203 (TM) starting at a magnetic tape start position 204 (BOT). The tape mark 203 is a code written to clear sections and the like of the data.

Each of the files 202a-202m is recorded in order from a first file heading label 211 (HDR1), a second file heading label 212 (HDR2), the tape mark 203 (TM), a first file end label (EOF1), to a second file end label 215 (EOF2). Actual data of each file is recorded to data 213a-213n, and the contents of the data depend on software which executes backup operations and the like. Note here that "m" and "n" are natural numbers, and "m" and "n" may or may not be equal to each other.

The volume label 201, the first file heading label 211, the second file heading label 212, the first file end label 214, and the second file end label 215 are defined as 80-byte data, respectively. Such information does not correspond to the volume information and the data management information described above.

The virtual tape device 1 according to the first exemplary embodiment of the invention can provide an effect of reducing the power consumption in a case where the writing processing is performed essentially after the mount processing. However, practically, it is common that the volume label 201 is read by the reading processing first immediately after the mount processing, and the host computer 2 recognizes the volume therewith. It is essential to turn on the magnetic disk device of the disk array 22, 23, or 24 to which the virtual tape is arranged for performing the reading processing. As a result, it is not possible to obtain the effect of reducing the number of turning on the power of the magnetic disk device of the disk array 22, 23, or 24.

Therefore, with the second exemplary embodiment, the volume label 201 is recorded in the magnetic disk device (MA #1) of the disk array 21 whose power is on at all times thereby to reduce the number of turning on the power of the magnetic disk device of the disk array 22, 23, or 24 anew even when performing the reading processing. More specifically, in addition to the volume information, the data of the volume label 201 is also stored in the magnetic disk device (MA #1) of the disk array 21 whose power is on at all times.

The data managing part 13b judges whether the data from the host computer 2 is the reading processing or the writing processing of the volume label 201. When it is the processing for writing the volume label 201, the data managing part 13b writes the volume label 201 to the magnetic disk device of the disk array 21 whose power is on at all times. When it is the processing for reading, the data managing part 13b reads out the information of the volume label 201 that is stored in the magnetic disk device of the disk array 22, 23, or 24. The data managing part 13 judges whether the data is the reading processing or the writing processing of the volume label 201 based on whether or not the data from the computer 2 contains data in a size of 80 bytes and within first four blocks.

The mount processing of the virtual tape is the same operation as that of the virtual tape device 1 shown in FIG. 2, so that explanations thereof are omitted.

Figure 6:
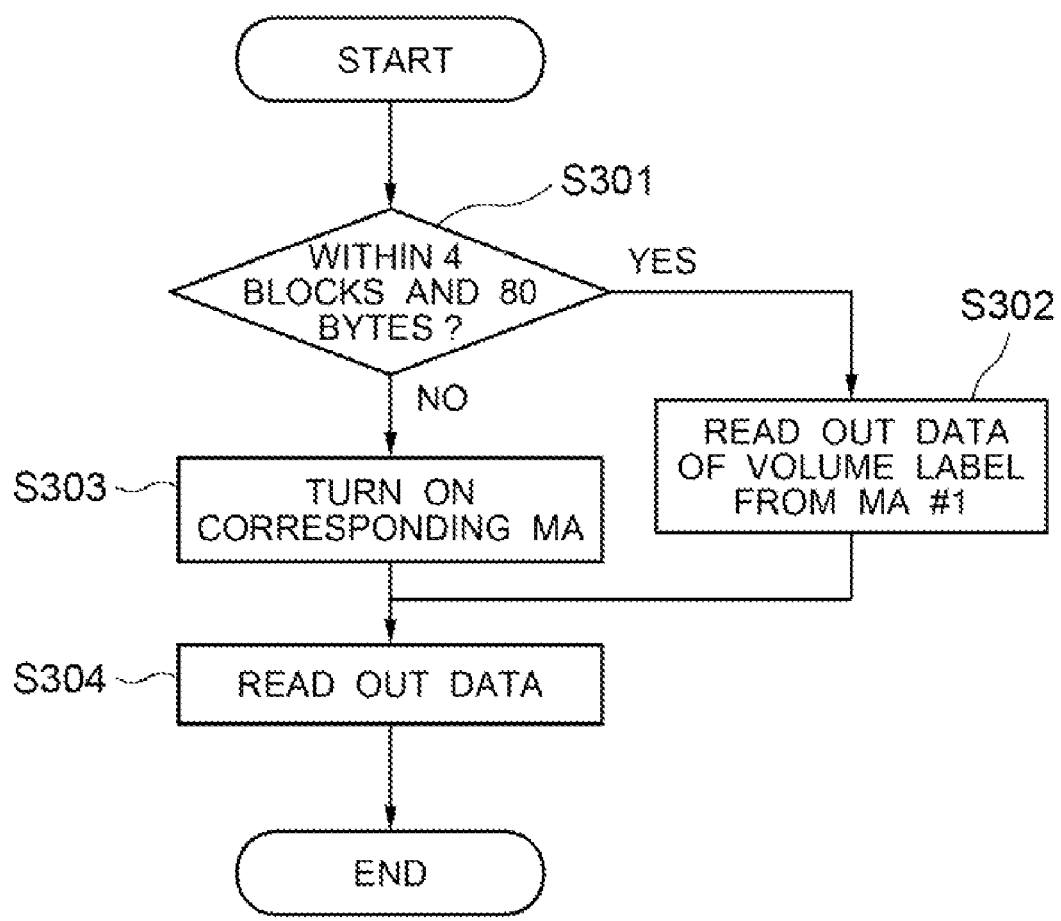
FIG. 6 is a flowchart showing reading processing of a volume label and virtual tape data executed by the virtual tape device shown in FIG. 4.

FIG. 6 is a flowchart showing the reading processing of the volume label executed by the virtual tape device 1b shown in FIG. 4. The data managing part 13b judges whether or not the data from the host computer 2 is the reading processing of the volume label 201. Specifically, when the data from the computer 2 does not contain data in a size of 80 bytes and within the first four block, the data managing part 13 judges that it is the reading processing of the volume label 201 (S301).

Then, the data managing part 13b reads out the volume label 201 stored in the magnetic disk device of the disk array 21 whose power is on at all times, and transmits the read-out volume label 201 to the host computer 2 via the data transferring part 14 (step S302). Thereby, the reading processing of the volume label is ended.

When judging in step S301 that it is not the reading processing of the volume label 201, the data managing part 13b controls the MA control part 15 to turn on the power of the magnetic disk device of the disk array 22, 23, or 24 to which the data of the virtual tape to be read out is stored (step S303), reads out the data of the virtual tape (volume) (step S304), transmits the read-out data to the host computer 2 via the data transferring part 14, and ends the reading processing as in the case of the first exemplary embodiment.

Figure 7:
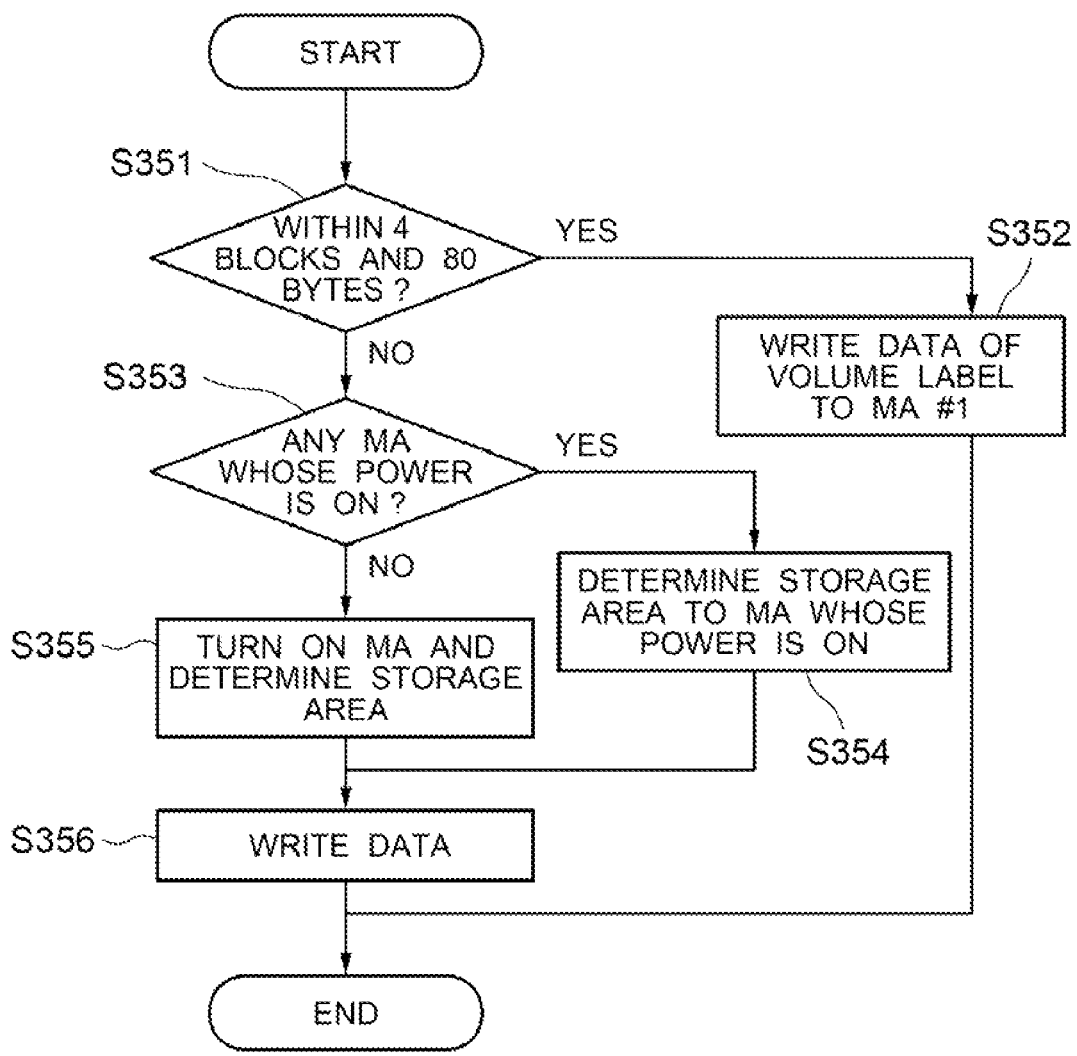
FIG. 7 is a flowchart showing writing processing of a volume label and virtual tape data executed by the virtual tape device shown in FIG. 4.

FIG. 7 is a flowchart showing the writing processing of the volume label executed by the virtual tape device 1b shown in FIG. 4.

The data managing part 13b judges whether or not the data from the host computer 2 is the writing processing of the volume label 201 (S351). When the data from the computer 2 contains the volume label 201 in a size of 80 bytes and within the first four blocs, the data managing part 13 judges that it is the writing processing of the volume label 201, and writes the volume label 201 to the magnetic disk device of the disk array 21 whose power is on at all times (step S352). Thereby, the writing processing of the volume label is ended.

When judging in step S351 that it is not the writing processing of the volume label 201, the data managing part 13b detects whether of not there is the magnetic disk device of the disk array 22, 23, or 24 whose power is on (S353) as in the case of the backup data writing operation described in the first exemplary embodiment. If there is, the data managing part 13b rearranges the virtual tape in the storage area of the magnetic disk device of the disk array 22, 23, or 24 whose power is on (S354), and writes the data, which is to be written to the magnetic disk device of the disk array 22, 23, or 24 whose power is off, to the rearranged virtual tape (S356). If there is not the disk array 22, 23, or 24 whose power is on, the data managing part 13b turns on the power of the disk array 22, 23, or 24, rearranges the virtual tape in the storage area of the disk array 22, 23, or 24 whose power is on, and writes the data to the rearranged virtual tape (S355, S356).

Through the above-described operations, the volume label 201 is recorded to the magnetic disk device (MA #1) of the disk array 21 whose power is on at all times. Therefore, it is possible to obtain the effect of reducing the power consumption also in the reading processing through reducing the number of newly turning on the power of the magnetic disk device of the disk array 22, 23, or 24 whose power is off.

Third Exemplary Embodiment

FIG. 8 is a conceptual diagram showing the structure of a virtual tape device 1c according to a third exemplary embodiment of the invention. Compared with the virtual tape device 1 according to the first exemplary embodiment of the invention shown in FIG. 1 and the virtual tape device 1b according to the second exemplary embodiment of the invention shown in FIG. 4, the virtual tape device 1c of the third exemplary embodiment has different functions regarding a volume information managing part 12c and a data managing part 13c as those of the virtual tape device 1. Further, the recording positions of a part of data are different (will be described in detail later). Except for those, the structural elements and the functions are the same as those of the first exemplary embodiment. Thus, only the different points from those of the first and second exemplary embodiments will be described hereinafter.

With the virtual tape device 1b according to the second exemplary embodiment of the invention, it is possible to obtain the effect of reducing the power consumption when performing backup from the head of the virtual tape. However, when performing backup by adding a postscript, file positioning processing for positioning it after the last file is executed first.

Thus, as shown in FIG. 5, the first file heading label 211, the second file heading label 212, the first file end label 214, the second file end label 215 (these are called together a file label 216 hereinafter) necessarily come in a next block of the tape mark 203. Therefore, it is necessary to repeat an operation of positioning the tape marks 203 in order from the head by a tape mark positioning command and reading the file label 216 in the next block of the positioned tape mark 203, until reaching the position of the target file label 216.

When performing this operation in the virtual tape device 1b, it becomes necessary for reading out the file label to turn on the power of MA to which the file label is stored. It often happens that a single virtual tape is arranged over a plurality of MAs. In such case, MAs that are irrelevant to the target file label 216 are to be turned on. If so, it is not possible to obtain the sufficient effect of reducing the number of turning on the power of MAs.

Thus, the third exemplary embodiment is structured to record not only the file label 201 but also the file label 216 to the magnetic disk device (MA #1) of the disk array 21 whose power is on at all times. This makes it possible to perform the file positioning processing in the case of backup with postscript without turning on the magnetic disk device of the disk array 22, 23, or 24 anew.

The data managing part 13c judges whether the data block from the host computer 2 is the writing processing or the reading processing of the volume label 201 or the file label 216. When it is the writing processing of the volume label 201 or the file label 216, the data managing part 13c writes the label to the magnetic disk device (MA #1) of the disk array 21 whose power is ON at all times. When it is the reading processing, the data managing part 13c executes the processing for reading out the label from the magnetic disk device (MA #1) of the disk array 21 whose power is on at all times When it is the data in a size of 80 bytes and within the first four blocks, the data managing part 13c judges that it is the volume label 201. If it is not the data in a size of 80 bytes and within the first four blocks, the data managing part 13c judges that it is the file label 216.

The mount processing of the virtual tape is the same operation as that of the virtual tape device 1 shown in FIG. 2, so that explanations thereof are omitted.

Figure 9:
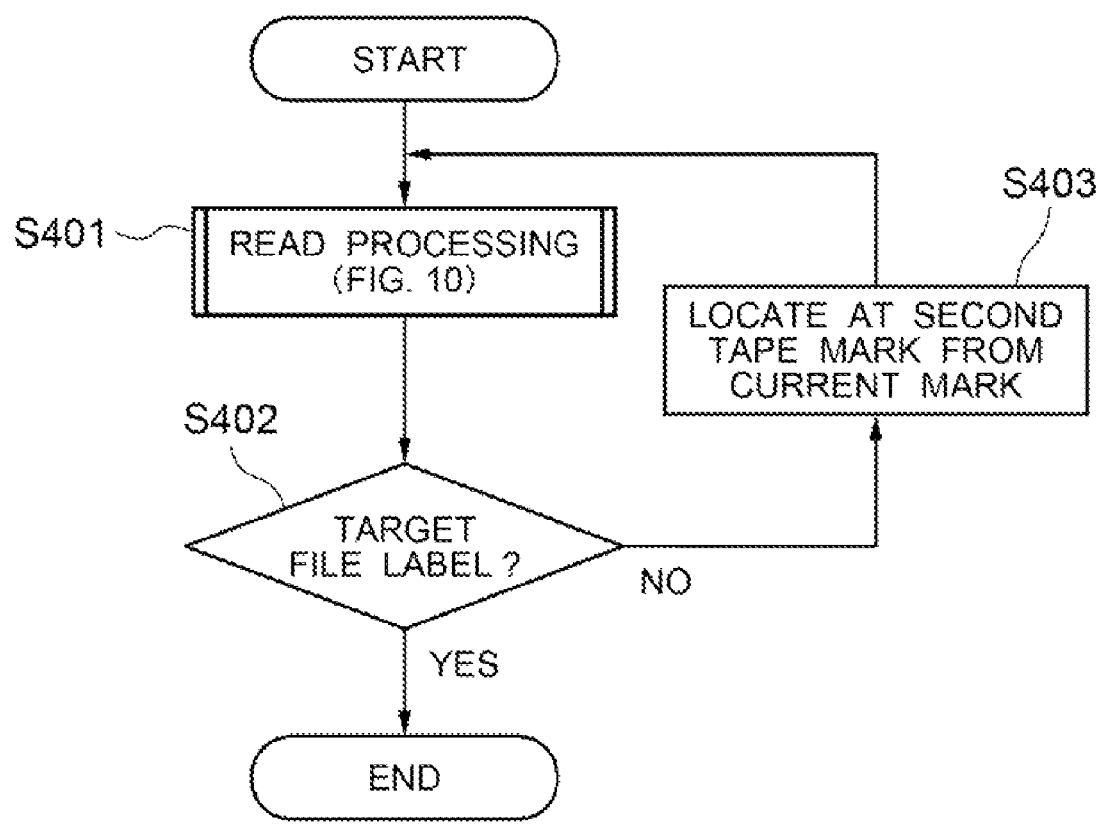
FIG. 9 is a flowchart showing file positioning processing executed by the virtual tape device and a host computer shown in FIG. 8.

FIG. 9 is a flowchart showing the file positioning processing executed by the virtual tape device 1c and the host computer 2 shown in FIG. 8. The host computer 2 first transmits a reading command, and the data managing part 13c reads the data of the file label 216 in the next block of the current tape mark 203 via the data transferring part 14 and returns it to the host computer 2 (step S401). This processing is the reading processing shown in FIG. 10 to be described later.

Subsequently, the host computer 2 judges whether or not the obtained file label 216 matches with the target file label (step S402). If those labels match with each other, the file positioning processing is completed. If those labels do not match with each other, the host computer 2 transmits a positioning command to skip the virtual tape data to perform positioning at the tape mark that is the second mark from that position. Accordingly, the data managing part 13c performs positioning processing (step S403). Thereafter, the processing of steps S402-S403 is repeated until the label matches with the target file label. The file labels 216 are all recorded in the MA #1, so that this processing does not require the operation for turning on/off the power of the MAs other than the MA #1.

Figure 10:
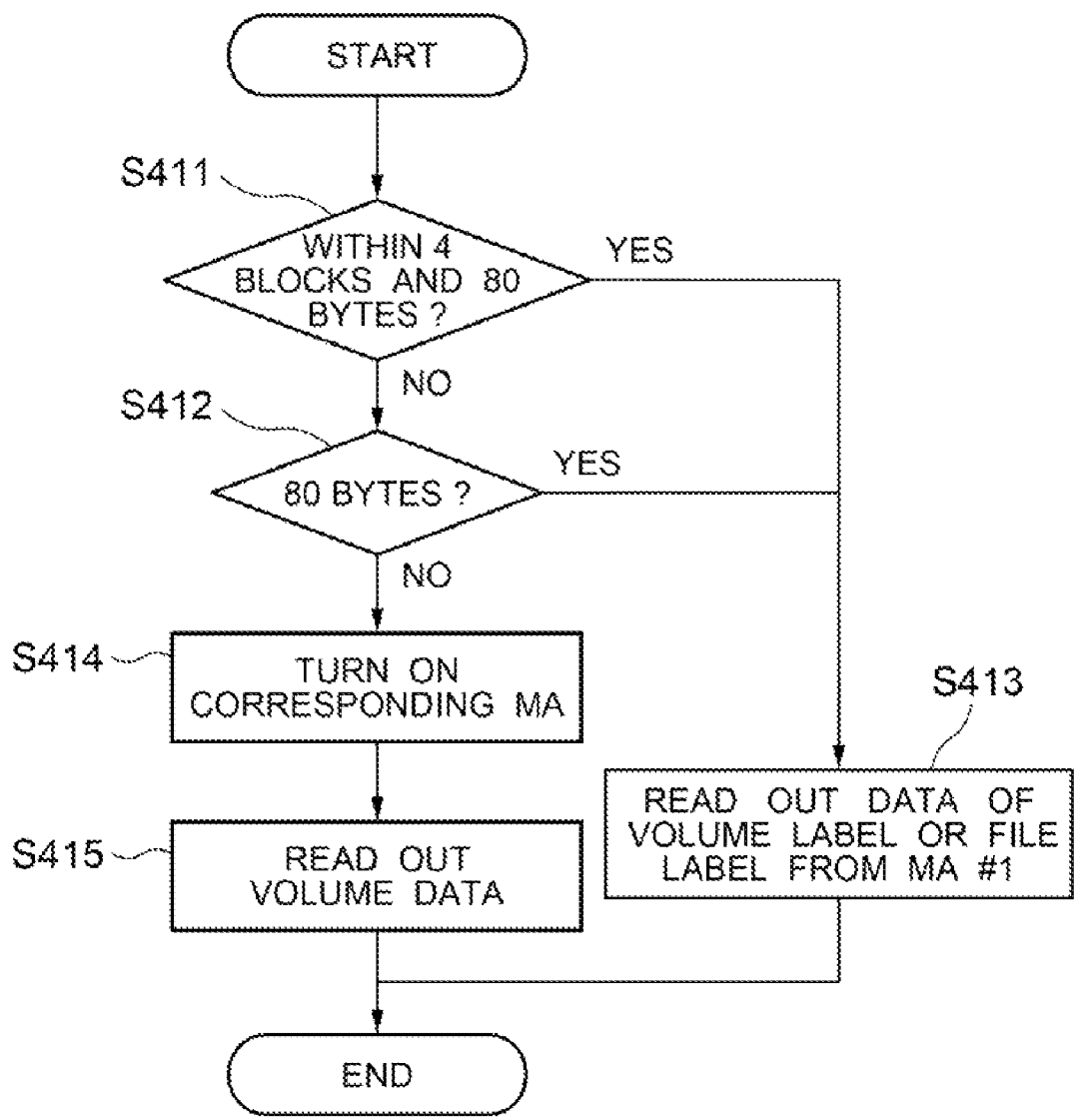
FIG. 10 is a flowchart showing reading processing of a volume label, a file label, and virtual tape data executed by the virtual tape device shown in FIG. 8.

FIG. 10 is a flowchart showing the reading processing of the volume label, the file label, and the virtual tape data executed by the virtual tape device 1c shown in FIG. 8. The data managing part 13c first judges whether or not the data indicated by the host computer 2 satisfies such a condition of the volume label 201 that it is in a size of 80 bytes and within the first four blocks (step S411). When judged that the data satisfies the condition of the volume label 201, the data managing part 13c reads out the data of the corresponding volume label 201 from the magnetic disk device (MA #1) of the disk array whose power is on at all times via the data transferring part 14 and transmits it to the host computer 2 (step S413). Thereby, the operation is ended.

When judged in step S411 that the data does not satisfy the condition of the volume label 201, the data managing part 13c then judges whether or not the data satisfies such a condition of the file label 216 that it is the data in a size of 80 bytes (step S412). When the data satisfies the condition of the file label 216, the data managing part 13c advances to step S413 to read out the data of the corresponding file label 216 from the magnetic disk device (MA #1) of the disk array whose power is on at all times and transmits it to the host computer 2. Thereby, the operation is ended.

When judged in step S412 that the data does not satisfy the condition of the file label 216, the data managing part 13c turns on the power of the magnetic disk device of the disk array 22, 23, or 24, which stores the data of the virtual tape corresponding to the instruction from the host computer 2, under a control of the MA control part 15 (step S414), and reads out the data and transmits it to the host computer 2 (step S415) as in the case shown in FIG. 6. Thereby, the operation is ended.

Figure 11:
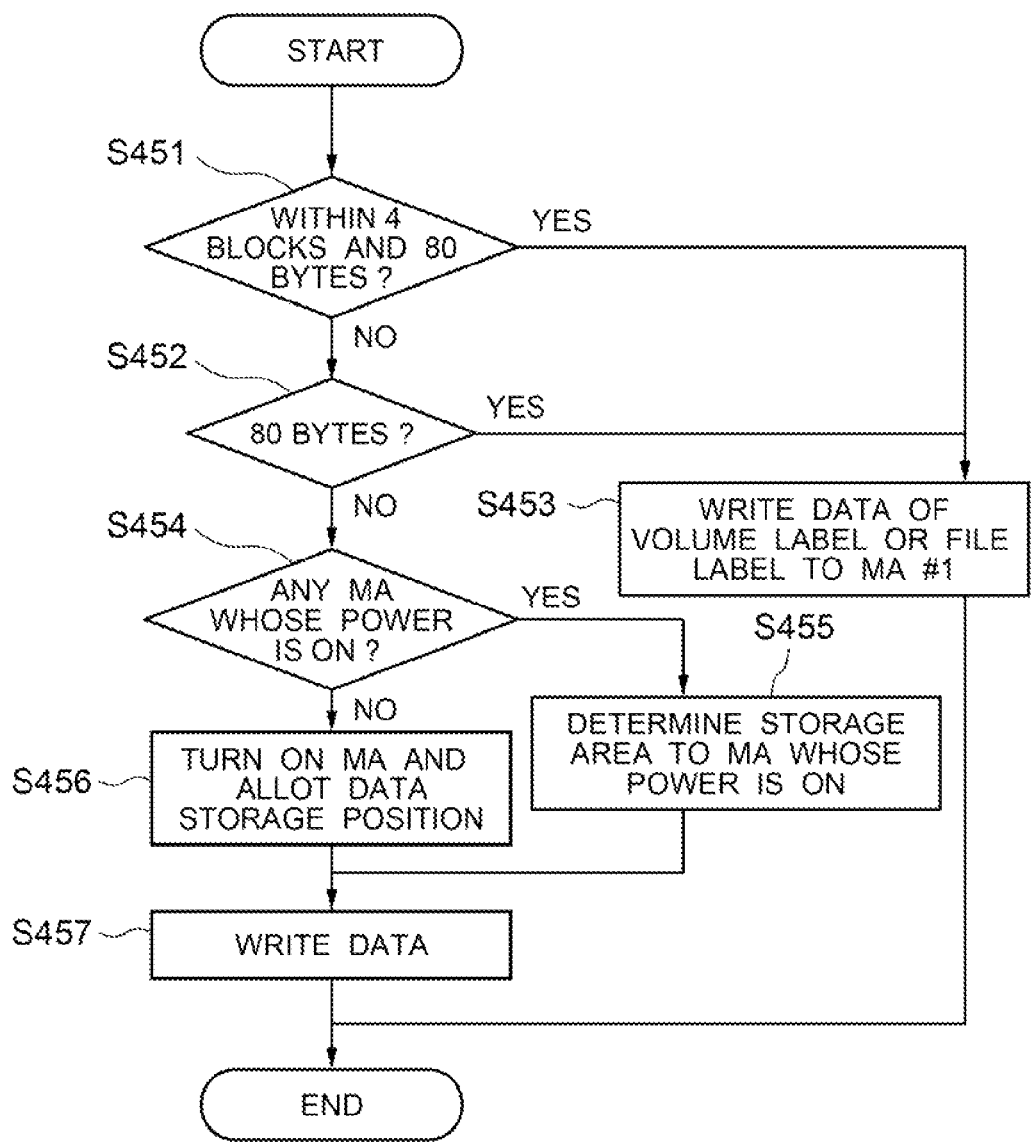
FIG. 11 is a flowchart showing writing processing of a volume label, a file label, and virtual tape data executed by the virtual tape device shown in FIG. 8.

FIG. 11 is a flowchart showing the writing processing of the volume label, the file label, and the virtual tap data executed by the virtual tape device shown in FIG. 8. The data managing part 13c first judges whether the writing block given from the host computer 2 satisfies such condition of the volume label 201 that it is in a size of 80 bytes and within the first four blocks (step S451).

When judged that the data satisfies the condition of the volume label 201, the data managing part 13c writes the volume label 201 to the magnetic disk device (MA #1) of the disk array 21 whose power is on at all times via the data transferring part 14 (step S453). Thereby, the operation is ended.

When judged in step S451 that the data does not satisfy the condition of the volume label 201, the data managing part 13c then judges whether or not the data satisfies such condition of the file label 216 that it is the data in a size of 80 bytes (step S452). When the data satisfies the condition of the file label 216, the data managing part 13c advances to step S453 to write the file label 216 to the magnetic disk device (MA #1) of the disk array 21 whose power is on at all times via the data transferring part 14. Thereby, the operation is ended.

When judged in step S452 that the data does not satisfy the condition of the file label 216, the data managing part 13c performs the same operation as that of FIG. 3, i.e., the same operation as that of the virtual tape device 1 (steps S454, S455, S456, and S457, which are the same as each of steps S151, S152, S153, and S154 shown in FIG. 3). Thereby, the operation is ended.

As described above, through recording not only the volume labels but also the data of the file labels to the magnetic disk device (MA #1) of the disk array whose power is on at all times, it becomes unnecessary to turn on the power of the magnetic disk device of the disk array to which the data is to be recorded for the positioning of those labels and for the reading processing. Therefore, it is possible to reduce the number of turning on the magnetic disk device of the disk array to which the data is to be stored also when performing data adding processing or processing for referring to the file names.

In each of the exemplary embodiments of the invention described above, the volume information managing parts 12, 12b, 12c and the data managing parts 13, 13b, 13c are built as hardware. However, the present invention is not limited only to such case. The present invention can also be built as a data backup program which implements the functions of the volume information managing parts 12, 12b, 12c and the data managing parts 13, 13b, 13c on software by having the program executed by a CPU. In that case, the data backup program is recorded on a recording medium.

The present invention has been described by referring to specific exemplary embodiments shown in the accompanying drawings. However, the present invention is not limited to those exemplary embodiments shown in the accompanying drawings. It is needless to say that any known structures can be employed as long as the effects of the present invention can be implemented therewith.

INDUSTRIAL APPLICABILITY

The present invention can be applied to disk array devices used for data backup.

What is claimed is:

1. A virtual tape device combined with a higher-order device that manages data with a tape device to manage the data, which is managed by the higher-order device with the tape device, with a disk base that uses two or more disk devices, the two or more disk devices being divided into an information managing disk group whose power is kept on at all times and to two or more recording disk groups whose power is turned on/off as necessary when managing the data, the virtual tape device comprising:
 a volume information managing part which manages positions of virtual tapes allotted to storage areas of the recording disk groups; and
 a data managing part which rearranges, in the recording disk group whose power is on among the recording disk groups, the virtual tape for storing the data to the recording disk group whose power is off based on writing or reading information stored in the information managing disk group and positional information of the virtual tapes managed by the volume information managing part, and executes a control to write the data to the recording disk group whose power is on.

2. The virtual tape device as claimed in claim 1, wherein the data managing part separates volume labels from data of virtual tapes managed by the volume information managing part, and manages the separated volume labels by storing the labels in the information managing disk group whose power is on at all times.

3. The virtual tape device as claimed in claim 2, wherein the data managing part manages not only the volume labels but also the file labels by storing the file labels in the information managing disk group whose power is on at all times.

4. The virtual tape device as claimed in claim 2, wherein the data managing part judges whether or not data written/read to/from the virtual tape device is the volume label and, when judged that the data is the volume label, manages the data by storing the data as the data of the volume label in the information managing disk group whose power is on at all times.

5. The virtual tape device as claimed in claim 4, wherein the data managing part judges the data written/read to/from the virtual tape device as the volume label when the data is in a size of 80 bytes and within first four blocks.

6. The virtual tape device as claimed in claim 4, wherein the data managing part judges whether data written/read to/from the virtual tape device is the volume label or the file label and, when judged that the data is the volume label or the file label, manages the data by storing the data as the data of the volume label or the file label in the information managing disk group whose power is on at all times.

7. The virtual tape device as claimed in claim 6, wherein the data managing part judges the data written/read to/from the virtual tape device as the volume label when the data is in a size of 80 bytes and within the first four blocks, and judges the data as the file label when the data is not the volume label and is in a size of 80 bytes.

8. A data backup method using a combination of a higher-order device that manages data with a tape device and a virtual tape device that manages data with a disk device to manage the data, which is managed by the higher-order device with the tape device, with a disk base that uses two or more disk devices, the data backup method comprising:
 dividing the two or more disk devices into an information managing disk group whose power is kept on at all times and to two or more recording disk groups whose power is turned on/off as necessary when managing the data;
 managing positions of virtual tapes allotted to storage areas of the recording disk groups by storing the positions in the information managing disk group;
 rearranging, in the recording disk group whose power is on among the recording disk groups, the virtual tape for storing the data to the recording disk group whose power is off based on writing or reading information and positional information of the virtual tapes stored in the information managing disk group; and
 executing a control to write the data to the recording disk group whose power is on.

9. The data backup method as claimed in claim 8, comprising: separating volume labels from data of virtual tapes; and managing the separated volume labels by storing the labels in the information managing disk group whose power is on at all times.

10. The data backup method as claimed in claim 9, wherein not only the volume labels but also the file labels are managed by storing the file labels in the information managing disk group whose power is on at all times.

11. The data backup method as claimed in claim 9, comprising:
 judging whether or not data written/read to/from the virtual tape device is the volume label; and when judged that the data is the volume label, managing the data by storing the data as the data of the volume label in the information managing disk group whose power is on at all times.

12. The data backup method as claimed in claim 11, wherein: the data written/read to/from the virtual tape device is judged as the volume label when the data is in a size of 80 bytes and within first four blocks.

13. The data backup method as claimed in claim 11, comprising:
   judging whether data written/read to/from the virtual tape device is the volume label or the file label; and
   when judged that the data is the volume label or the file label, managing the data by storing the data as the data of the volume label or the file label in the information managing disk group whose power is on at all times.

14. The data update method as claimed in claim 13, wherein the data written/read to/from the virtual tape device is judged as the volume label when the data is in a size of 80 bytes and within the first four blocks, and the data is judged as the file label when the data is not the volume label and is in a size of 80 bytes.

15. A computer readable recording medium to which a data backup program is recorded for controlling management of data, which is to be managed by a higher-order device using a tape device, with a disk base that uses two or more disk devices by combining a virtual tape device that manages the data with a disk device and the higher-order device that manages the data with the tape device, the two or more disk devices being divided into an information managing disk group whose power is kept on at all times and to two or more recording disk groups whose power is turned on/off as necessary when managing the data, the program enabling a computer to execute:
   a function of managing positions of virtual tapes allotted to storage areas of the recording disk groups by storing the positions in the information managing disk group; and
   a function of rearranging, in the recording disk group whose power is on among the recording disk groups, the virtual tape for storing the data to the recording disk group whose power is off based on writing or reading information and positional information of the virtual tapes stored in the information managing disk group, and executing a control to write the data to the recording disk group whose power is on.

16. The computer readable recording medium as claimed in claim 15, which carries the program for enabling the computer to execute a function of separating volume labels from data of virtual tapes, and managing the separated volume labels by storing the labels in the information managing disk group whose power is on at all times.

17. The computer readable recording medium as claimed in claim 16, which carries the program for enabling the computer to execute a function of managing not only the volume labels but also the file labels by storing the file labels in the information managing disk group whose power is on at all times.

18. The computer readable recording medium as claimed in claim 16, which carries the program for enabling the computer to execute a function of judging whether or not data written/read to/from the virtual tape device is the volume label and, when judged that the data is the volume label, managing the data by storing the data as the data of the volume label in the information managing disk group whose power is on at all times.

19. The computer readable recording medium as claimed in claim 18, which carries the program for enabling the computer to execute a function of judging the data written/read to/from the virtual tape device as the volume label when the data is in a size of 80 bytes and within first four blocks.

20. The computer readable recording medium as claimed in claim 18, which carries the program for enabling the computer to execute a function of judging whether data written/read to/from the virtual tape device is the volume label or the file label and, when judged that the data is the volume label or the file label, managing the data by storing the data as the data of the volume label or the file label in the information managing disk group whose power is on at all times.

21. The computer readable recording medium as claimed in claim 20, which carries the program for enabling the computer to execute a function of judging the data written/read to/from the virtual tape device as the volume label when the data is in a size of 80 bytes and within the first four blocks, and judging the data as the file label when the data is not the volume label and is in a size of 80 bytes.

22. Virtual tape means, combined with higher-order means for managing data with a tape device, for managing the data, which is managed by the higher-order means with the tape device, with a disk base that uses two or more disk devices, the two or more disk devices being divided into an information managing disk group whose power is kept on at all times and to two or more recording disk groups whose power is turned on/off as necessary when managing the data, the virtual tape means comprising:
   volume information managing means for managing positions of virtual tapes allotted to storage areas of the recording disk groups; and
   data managing means for rearranging, in the recording disk group whose power is on among the recording disk groups, the virtual tape for storing the data to the recording disk group whose power is off based on writing or reading information stored in the information managing disk group and positional information of the virtual tapes managed by the volume information managing means, and executing a control to write the data to the recording disk group whose power is on.

\* \* \* \* \*